(12) United States Patent
Koutoku et al.

(10) Patent No.: US 8,815,034 B2
(45) Date of Patent: Aug. 26, 2014

(54) PNEUMATIC RADIAL TIRE AND PROCESS FOR PRODUCING RETREADED TIRE

(75) Inventors: Kouichi Koutoku, Kanagawa (JP); Mitsuo Sakurai, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 517 days.

(21) Appl. No.: 12/990,807

(22) PCT Filed: May 14, 2009

(86) PCT No.: PCT/JP2009/059018
§ 371 (c)(1),
(2), (4) Date: Nov. 3, 2010

(87) PCT Pub. No.: WO2009/139449
PCT Pub. Date: Nov. 19, 2009

(65) Prior Publication Data
US 2011/0056603 A1    Mar. 10, 2011

(30) Foreign Application Priority Data
May 16, 2008 (JP) ................................. 2008-130179

(51) Int. Cl.
*B29D 30/54* (2006.01)
*B60C 11/02* (2006.01)
*B60C 9/18* (2006.01)

(52) U.S. Cl.
USPC .............. 156/128.1; 156/110.1; 156/123; 156/130.5; 152/209.1; 152/209.5; 152/209.6; 152/526

(58) Field of Classification Search
None
See application file for complete search history.

(56) References Cited

U.S. PATENT DOCUMENTS

| | | | | |
|---|---|---|---|---|
| 4,497,927 A | * | 2/1985 | Tai et al. | 524/475 |
| 5,054,177 A | * | 10/1991 | Jensen | 407/29.12 |
| 5,307,850 A | * | 5/1994 | Halasa et al. | 152/209.5 |
| 7,501,040 B2 | | 3/2009 | Matsuda et al. | |
| 2005/0194081 A1 | * | 9/2005 | Yano et al. | 152/527 |
| 2006/0094829 A1 | * | 5/2006 | Chino et al. | 525/301 |
| 2008/0103287 A1 | * | 5/2008 | Chino et al. | 528/421 |

FOREIGN PATENT DOCUMENTS

| | | | |
|---|---|---|---|
| JP | 06320906 | * | 11/1994 |
| JP | 10-35221 | * | 2/1998 |
| JP | 11-189009 | * | 7/1999 |
| JP | 2003-104010 A | | 4/2003 |
| JP | 2004-224278 | * | 8/2004 |

(Continued)

*Primary Examiner* — Justin Fischer
(74) *Attorney, Agent, or Firm* — Carrier Blackman & Associates, P.C.; Joseph P. Carrier; William D. Blackman

(57) ABSTRACT

A pneumatic radial tire includes: at least one carcass layer suspended across left and right bead parts; a belt layer arranged on an outer circumferential side of the carcass layer; and a tread arranged on an outer circumferential side of the belt layer. The tread has a laminated structure in which a thermoplastic film layer of a thermoplastic resin or a thermoplastic elastomer composition is interposed between a tread-side rubber layer and a belt layer-side rubber layer. The thermoplastic elastomer composition is obtained by blending an elastomer in a thermoplastic resin. A process for producing a retreaded tire includes the steps of: forming a base tire from the pneumatic radial tire by softening the thermoplastic film layer through heating so as to separate and remove the tread-side rubber layer, the pneumatic radial tire having the tread worn away; and subsequently bonding a new tread-side rubber layer onto the base tire.

14 Claims, 2 Drawing Sheets

(56) References Cited

FOREIGN PATENT DOCUMENTS

| JP | 2004-359073 | A | | 12/2004 |
|---|---|---|---|---|
| JP | 2004-359074 | A | | 12/2004 |
| JP | 2005-280021 | A | | 10/2005 |
| WO | WO 99/22951 | | * | 5/1999 |

* cited by examiner

PNEUMATIC RADIAL TIRE AND PROCESS FOR PRODUCING RETREADED TIRE

TECHNICAL FIELD

The present invention relates to a pneumatic radial tire and a process for producing a retreated tire. In particular, the present invention relates to a pneumatic radial tire from which a retreaded tire is easily produced after the tread of the pneumatic radial tire wears away, and to a process of producing a retreaded tire by use of the pneumatic radial tire.

BACKGROUND ART

In Japan, as is often the case with tires for trucks and buses in particular, a used tire whose tread wears away is reused as a retreaded tire by subjecting the used tire to rework so as to bond a new tread onto the used worn tire (for example, refer to Patent Document 1 or the like). In countries other than Japan, use of retreaded tires is common not only for tires for trucks and buses but also for tires for passenger cars.

A process for producing such a retreaded tire is achieved by removing unnecessary rubber from the tread surface of the used tire in a buffing process so that the height thereof is reduced to a required height; and bonding a new tread rubber onto the tire after the removing as a base tire.

However, since the degree of the tread wear differs among used tires, the buffing step of obtaining a base tire takes various lengths of time, and requires a considerably long time.

With this taken into consideration, in order to produce retreaded tires which fall within a certain range of dimensional specifications under good production management and process management, control on the lengths of the buffing time, the depth of buffing, and the like, at the time of the retreading process of individual used tires becomes important for the purpose of increasing the productivity. Accordingly, improvement in process simplification, uniformity, and the like in terms of the process management and quality control has been demanded for the purpose of enhancing the productivity of retreaded tires.

PRIOR ART DOCUMENT

Patent Document

Patent Document 1: Japanese patent application Kokai publication No. 2003-104010

SUMMARY OF THE INVENTION

Problem to be Solved by the Invention

With the foregoing point taken into consideration, an object of the present invention is to provide a pneumatic radial tire which allows enhancement of productivity of retreaded tires without actually providing a process for buffing away a tread rubber, and a process for producing a retreaded tire.

Means for Solving the Problem

A pneumatic radial tire of the present invention to achieve the above-described object has the following configuration (1).

(1) A pneumatic radial tire having: at least one carcass layer suspended across left and right bead parts; a belt layer arranged on an outer circumferential side of the carcass layer; and a tread arranged on an outer circumferential side of the belt layer, wherein the tread has a laminated structure in which a thermoplastic film layer made of any one of a thermoplastic resin and a thermoplastic elastomer composition obtained by blending an elastomer in a thermoplastic resin is interposed between a tread-side rubber layer and a belt layer-side rubber layer.

In addition, it is more preferable that the pneumatic radial tire of the present invention should have any one of the configurations described in (2) to (7) below.

(2) The pneumatic radial tire described in (1) above, wherein a width of the thermoplastic film layer is at least equal to or larger than a maximum width of the belt layer.

(3) The pneumatic radial tire described in any one of (1) and (2) above, wherein an adhesive layer is laminated to at least one surface of the thermoplastic film layer.

(4) The pneumatic radial tire described in any one of (1) to (3) above, wherein a thickness of the belt layer-side rubber layer is not less than 2 mm and not more than 5 mm.

(5) The pneumatic radial tire described in any one of (1) to (4) above, wherein a thickness of the thermoplastic film layer is 50 to 150 μm.

(6) The pneumatic radial tire described in any one of (1) to (5) above, wherein the thermoplastic film layer is placed intermittently in a tire meridian cross section, and a density of the placement of the thermoplastic film layer in a tire center portion is higher than the density of the placement in a tire shoulder portion.

(7) The pneumatic radial tire described in any one of (1) to (6) above, wherein a large number of through-holes are provided in the thermoplastic film layer.

In addition, a process for producing a retreaded tire of the present invention to achieve the above-described object has the following configuration (8).

(8) A process for producing a retreaded tire, comprising the steps of: forming a base tire from the pneumatic radial tire described in any one of (1) to (7) above by softening the thermoplastic film layer through heating so as to separate and remove the tread-side rubber layer, the pneumatic radial tire having the tread worn away, and subsequently bonding a new tread-side rubber layer onto the base tire.

In addition, it is more preferable that the process for producing a retreaded tire of the present invention should have the following configuration (9).

(9) The process for producing a retreaded tire described in (8) above, wherein the step of bonding the new tread-side rubber layer onto the base tire includes arranging a new thermoplastic film layer between the base tire and the tread-side rubber layer.

Effects of the Invention

In the case of the present invention, the tread has the laminated structure in which the thermoplastic film layer is interposed between the tread-side rubber layer and the belt layer-side rubber layer. For this reason, when a retreaded tire is produced, once the thermoplastic film layer is softened by heating the tread, it is possible to easily separate the remaining tread-side rubber layer without actually providing a buffing process. Accordingly, retreaded tires can be produced with high productivity and low cost.

In addition, in the case of the pneumatic radial tire according to the present invention, the thermoplastic film layer has excellent air impermeability. For this reason, leaking of the air from the inside of the tire to the outside thereof or permeation of the air entering from the outside of the tire into the inside thereof can be prevented. Accordingly, deterioration of the tread rubber and the like by oxidation can be satisfactorily inhibited.

Moreover, a phenomenon can be prevented in which oil blended in the tread rubber migrates to the other members (a belt coat rubber layer, a carcass coat rubber layer, wing tip rubbers, and the like) of the tire. For this reason, the initial characteristics of these other members can be maintained for an extended period of time.

In addition, the process for producing a retreaded tire according to the present invention enables a retreaded tire to be produced without actually providing a buffing process, thereby enhancing the productivity.

BEST MODES FOR CARRYING OUT THE INVENTION

Figure 1:
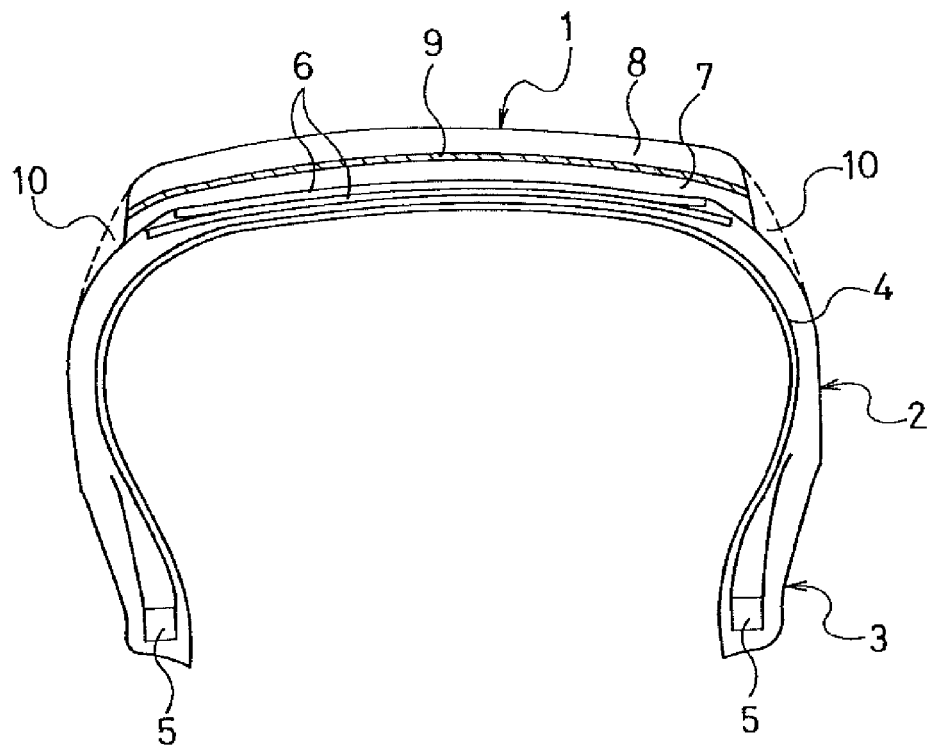
FIG. 1 is a schematic cross-sectional view showing, as a model, an embodiment example of a pneumatic radial tire according to the present invention, which is taken along a meridian of the tire.

Hereinbelow, detailed descriptions will be provided for a pneumatic radial tire according to the present invention on the basis of embodiments illustrated in the drawings.

FIG. 1 shows, as a model, an embodiment example of the pneumatic radial tire according to the present invention in the form of a cross-sectional view of the pneumatic tire taken along a meridian line of the pneumatic tire.

Figure 2:
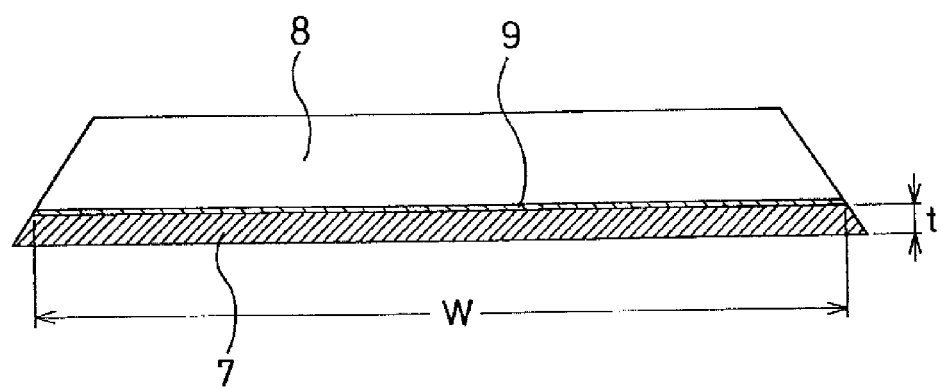
FIG. 2 is a main-part schematic cross-sectional view showing, as a model, a cross section of a tread rubber part, which is taken along a meridian line, for the purpose of explaining the embodiment example of the pneumatic radial tire according to the present invention.

Reference sign 1 denotes a tread; 2, a sidewall part; 3, a bead part; and 5, a bead core. A carcass layer 4 is locked to left and right bead cores 5 in such a way that two end portions of the carcass layer 4 are folded back around the left and right bead cores 5 from the tire inner side to the tire outer side, respectively. Belt layers 6 (two layers are shown in FIG. 2) are disposed on the outer circumferential side of the carcass layer 4. In addition, the tread 1 is disposed on the outer circumferential side of the belt layers 6. The tread 1 is made up of a laminated structure in which a thermoplastic film layer 9 is interposed between a belt layer-side rubber layer 7 and a tread-side rubber layer 8, the thermoplastic film layer 9 being made of a thermoplastic resin or a thermoplastic elastomer composition obtained by blending an elastomer in the thermoplastic resin. Reference sign 10 denotes wing tip rubbers which are disposed at the two end portions of the tread rubber 1.

In the case of the pneumatic radial tire according to the present invention, the tread 1 is made up of the laminated structure including the belt layer-side rubber layer 7, the thermoplastic film layer 9, and the tread-side rubber layer 8. For this reason, in tire retreading, when the thermoplastic film layer 9 is softened or melted by heating at least the tread portion so as to heat the thermoplastic film layer 9 to a temperature not lower than a temperature at which the thermoplastic film layer softens but not higher than a temperature at which the thermoplastic film layer melts, the tread-side rubber layer 8 can be easily separated from the tread by using the thermoplastic film layer as a boundary surface. In general, it is desirable that the heating temperature should be 140° C. to 200° C. It is more desirable that the heating temperature should be 140° C. to 180° C. No specific restriction is imposed on means for the tread heating method. The heating of the tread may be achieved by irradiation of the tread surface with infrared rays, or by transferring heat to the tread with a heater being in contact with the tread. Otherwise, the heating of the tread may be achieved by putting the entire tire in a heating thermostatic bath.

Accordingly, the use of the tire according to the present invention makes it possible to actually omit the buffing process for buffing away the tread-side rubber layer 8 for the purpose of obtaining a base tire, when a retreaded tire is produced from a tire having worn away. Even if buffing needs to be carried out, the extent of the buffing does not go beyond the removal of a remaining portion of the thermoplastic film layer 9.

In the case of the present invention, examples preferably used as the thermoplastic resin and the thermoplastic resin in the thermoplastic elastomer composition obtained by blending an elastomer in the thermoplastic resin, the thermoplastic resins constituting the thermoplastic film layer, include: polyamide-based resins [for instance, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers]; their N-alkoxyalkylates, for instance, methoxymethylated nylon 6, methoxymethylated nylon 6/610 copolymers, and methoxymethylated nylon 612; polyester-based resins [for instance, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for instance, polyacrylonitrile (PAN), polymethacrylonitrile, acrylonitrile/styrene copolymers (AS), (meth)acrylonitrile/styrene copolymers, (meth)acrylonitrile/styrene/butadiene copolymers]; polymethacrylate-based resins [for instance, polymethyl methacrylate (PMMA), polyethylmethacrylate]; polyvinyl-based resins [for instance, polyvinyl acetate, polyvinyl alcohol (PVA), vinyl alcohol/ethylene copolymers (EVOH), polyvinylidene chloride (PDVC), polyvinyl chloride (PVC), vinyl chloride/vinylidene chloride copolymers, vinylidene chloride/methyl acrylate copolymers, vinylidene chloride/acrylonitrile copolymers (ETFE)]; cellulose-based resins [for instance, cellulose acetate, and cellulose acetate butyrate]; fluororesins [for instance, polyvinylidene fluoride (PVDF), polyvinyl fluoride (PVF), polychlorotrifluoroethylene (PCTFE), tetrafluoroethylene/ethylene copolymers]; imide-based resins [for instance, aromatic polyimide (PI)]; and the like.

Further, examples of the elastomer preferably used to make the thermoplastic elastomer composition include: diene rubbers and their hydrogenated products [for instance, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, hydrogenated SBR]; olefin-based rubbers [for instance, ethylene propylene rubbers (EPDM and EPM), maleic acid-modified ethylene propylene rubber (M-EPM), butyl rubber (IIR), copolymers of isoprene and aromatic vinyl or diene monomer, acrylic rubber (ACM), and ionomers]; halogen-containing rubbers [for instance, Br-IIR, CI-IIR, brominated isobutylene para-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for instance, methyl vinyl silicone rubber, dimethyl silicone rubber, methylphenylvinyl silicone rubber]; sulfur-containing rubbers [for instance, polysulfide rubber]; fluororubbers [for instance, vinylidene fluoride-based rubbers, fluorine-containing vinyl ether-based rubbers, tetrafluoroethylene propylene-based rubbers, fluorine-containing silicone-based rubbers, fluorine-containing phosphazene-based rubbers]; thermoplastic elastomers [for instance, styrene-based elastomers, olefin-based elastomers, ester-based elastomers, urethane-based elastomers, and polyamide-based elastomers]; and the like.

No specific restriction is imposed on the composition ratio of a specified thermoplastic resin to a specified elastomer in the thermoplastic elastomer composition. This composition ratio may be set depending on the necessity so as to obtain a structure in which the elastomer is dispersed as a discontinuous phase in the matrix of the thermoplastic resin. A preferred range is 90/10 to 30/70 in weight ratio.

No specific restriction is imposed on the Young's modulus of the thermoplastic resin and the thermoplastic elastomer composition. It is desirable the Young's modulus thereof should be set in a range of 1 to 500 MPa. It is more desirable that the Young's modulus should be set in a range of 50 to 500 MPa.

The thermoplastic film layer 9 has excellent air impermeability. For this reason, leaky permeation of the air going through from the inside of the tire to the outside thereof or permeation of the air entering from the outside of the tire into the inside thereof can be prevented. Accordingly, an effect of being capable of inhibiting deterioration of the tread rubber and the like by oxidation can be further exerted. In addition, in the case where oil is blended in the tread rubber, a phenomenon can be prevented in which the oil migrates from the tread rubber to the other members of the tire over time. For this reason, the initial characteristics of these other members can be maintained for an extended period of time.

In the case of the present invention, it is preferable that the thickness of the thermoplastic film layer should be in a range of 50 to 150 μm. If the thickness of the thermoplastic film layer is less than 50 μm, separation of the tread-side rubber layer 8 may not be successfully completed, or the air impermeability and the effect of preventing the migration may not be exerted. In addition, if the thickness of the thermoplastic film layer is more than 150 μm, the difference in rigidity between the thermoplastic film layer and the tread rubber is salient, and the durability performance of the tire as a whole may be accordingly degraded. For this reason, it is undesirable that the thickness thereof should exceed 150 μm.

Generally speaking, the adhesion of the thermoplastic film layer to a contiguous rubber layer is low. For this reason, it is preferable that the thermoplastic film layer should be used in the form of a laminated structure body obtained by laminating an adhesive layer to one or both surfaces of the thermoplastic film. Such use makes it possible to enhance the adhesion to the contiguous belt layer-side rubber layer 7 and the contiguous tread-side rubber layer 8.

Examples of the adhesive layer used here, in the case of an adhesive rubber layer, include diene rubbers, such as epoxized natural rubber, halogenized butyl rubber, and butyl rubber. In the case of an adhesive polymer layer, examples include: ultra-high-molecular-weight polyethylenes (UHMWPE) with a molecular weight of not less than one million, preferably not less than three million; acrylate copolymers, such as ethylene-ethyl acrylate copolymers (EEA), ethylene methyl acrylate resins (EMA), and ethylene acrylic-acid copolymers (EAA), as well as their maleic anhydride adducts; polypropylenes (PP) and their maleic-modified products; ethylene propylene copolymers and their maleic-modified products; polybutadiene resins and their anhydride maleic-modified products; styrene-butadiene-styrene copolymers (SBS); styrene-ethylene-butadiene-styrene copolymers (SEBS); fluoride-based thermoplastic resins; polyester-based thermoplastic resins; and the like. These can be molded into a sheet or film by a conventional method, for instance, by extrusion with a resin extruder. No specific restriction is imposed on the thickness of the adhesive layer. A smaller thickness of the adhesive layer serves better for the purpose of reducing the weight of the tire. In the case of the adhesive polymer, it is preferable that the thickness should be 5 μm to 150 μm. In the case of the adhesive rubber layer, it is preferably 50 μm to 1 mm, and further, it is more preferably 100 μm to 500 μm.

In the case of the present invention, it is preferable that the thickness (denoted by t in FIG. 2) of the belt layer-side rubber 7 should be not less than 2 mm but not more than 5 mm. If the thickness of the belt layer-side rubber 7 is less than 2 mm, it is highly likely that, when the tread 1 is heated, the heat may be transmitted to the belt layer. In such a case, the belt coat rubber is deteriorated by the heat. In other words, such a tire whose belt coat rubber is deteriorated by heat can no longer be reused as a base tire for a retreaded tire. For this reason, it is undesirable that the thickness of the belt layer-side rubber 7 should be less than 2 mm. Furthermore, if the thickness thereof is more than 5 mm, it is likely that, when the tire wears away, the thermoplastic film layer 9 may be exposed, thereby being damaged, so that a desired retreading process cannot be carried out.

Moreover, it is preferable that the width W (FIG. 2) of an area in which the thermoplastic film layer 9 spreads in the tire widthwise direction should be at least equal to or larger than the width of the widest belt out of the belt layers. If this spread width W is smaller than the width of the widest belt, separation of the tread-side rubber layer 8 is difficult.

Figure 3:
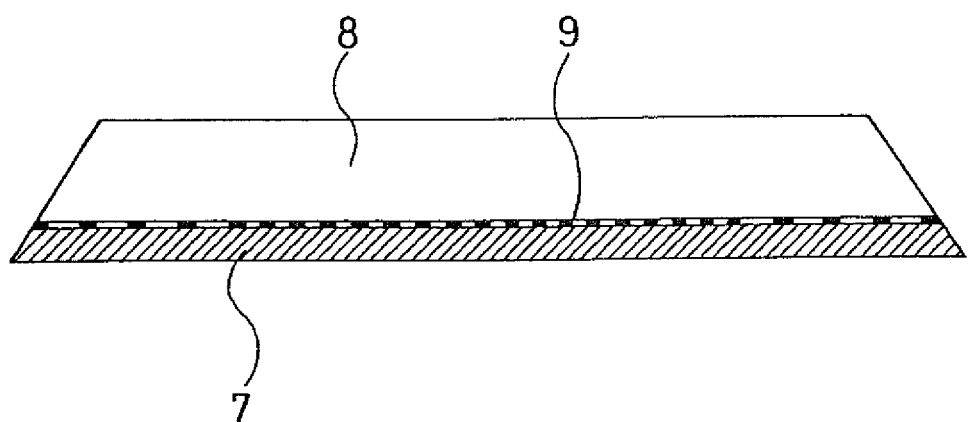
FIG. 3 is a main part schematic cross-sectional view showing, as a model, a cross section of a tread rubber part, which is taken along a meridian line, for the purpose of explaining another embodiment example of the pneumatic radial tire according to the present invention.

As shown in FIG. 3, the thermoplastic film layer 9 may be placed intermittently in the tire meridian cross section for the purpose of satisfactorily keeping the adhesion between the tread-side rubber layer 8 and the belt layer-side rubber layer 7. Furthermore, with regard to the placement density in this case, it is preferable that the placement density in the tire center portion should be higher than the placement density in a tire shoulder portion. Such a placement density makes it possible to enhance the strength of the adhesion between these two rubber layers 7 and 8 in each shoulder portion. This can prevent a phenomenon in which, as receiving a strong twist torque in cornering and the like, a portion of the tire near each shoulder portion is likely to create a crack or delamination as a result of the incapability of the thermoplastic film layer to follow the movement of the tread rubber. The intermittent presence of the thermoplastic film layer can be achieved by winding a layer having a narrow sheet shape or a tape shape or doing the like.

Alternatively, many through-holes may be provided in the thermoplastic film layer. The provision of such through-holes makes it possible to enhance the adhesion between the belt layer-side rubber 7 and the tread-side rubber layer 8, thereby being capable of improving the durability.

After having the tread worn away to a limit of wear, the pneumatic radial tire according to the present invention can be subjected to the retreading process in which, as described above, the thermoplastic film layer 9 is softened or melted by heating the tread portion, and then the tread-side rubber layer 8 remaining after the wear is separated by using this thermoplastic film layer as a separation surface. A process of bonding a tread rubber onto the base tire from which the tread-side rubber layer has been separated is almost the same as a conventional retreading process.

To put it specifically, the bonding of a tread-side rubber layer onto the base tire may be achieved by bonding and vulcanizing an unvulcanized rubber member onto the base tire, or by bonding a vulcanized rubber onto the base tire with an adhesive layer being interposed in between.

When, as described above, a new tread-side rubber layer is formed on the base tire, it is preferable that the new thermoplastic film layer, that is to say, a thermoplastic film layer made of a thermoplastic resin or a thermoplastic elastomer composition obtained by blending an elastomer in a thermoplastic resin, should be placed between the base tire and the new tread-side rubber layer. The producing of the treaded tire in this manner makes a production process of the next retreaded tire favorable.

In the production of the pneumatic radial tire according to the present invention, the tread rubber may be formed on the outer periphery of a primary green tire, which has been obtained by bonding the belt layer to the outer periphery of the carcass layer, by sequentially bonding thereon the belt layer-side rubber layer 7, the thermoplastic film layer 9 on the belt layer-side rubber layer 7, and thereon the tread-side rubber layer 8. Alternatively, the tread rubber may be formed by covering the primary green tire with the laminated structure body prepared in advance of the belt layer-side rubber layer 7, the thermoplastic film layer 9, and the tread-side rubber layer 8.

Because the tread of the pneumatic radial tire according to the present invention has the laminated structure as described above, in order to prevent end portions of the thermoplastic film layer 9 from being exposed to side end surfaces as they would otherwise, it is desirable that the wing tip rubbers 10 should be bonded to the respective end portions of the thermoplastic film layer 9, as indicated by the dotted lines in FIG. 1, for the purpose of preventing them from being directly exposed to the outside.

EXAMPLES

In a process of retreading used pneumatic radial tires each with a tire size of 11R22.5, a gauge under a tread groove of 5 mm, and a depth of the groove remaining after wear of 3 mm, a tire (Example 1) and a conventional tire (Conventional Example) were produced, the tire including the thermoplastic film layer 9, which was (with a thickness of 100 μm) made of a thermoplastic elastomer composition including nylon 6/66 and Br-IPMS, placed at a position 3 mm above the belt between the belt layer-side rubber layer 7 with a thickness of 3 mm and the tread-side rubber layer 8 with a thickness of 4.5 mm, the conventional tire including no thermoplastic film layer 9 placed therebetween.

Note that the thermoplastic film layer 9 had on the outer periphery thereof an adhesive layer (with a thickness of 400 μm) contiguously bonded thereto.

These above two tires were subjected to the retreading process in accordance with the respective methods described below.

The tire according to Example was made into a base tire by heating the tread surface at 160° C., and thus separating the tread surface from the tire. The tire according to Conventional Example was made into a base tire by buffing the tread to the position which was 3 mm above the belt.

Periods of time needed to produce the respective base tires were expressed in index numbers with that of Conventional Example set to 100 so as to be evaluated. In the result (in which a smaller index value meant a shorter work time), that of Example was 90. Accordingly, it was confirmed that the present invention was able to produce a retreaded tire in a shorter length of time.

EXPLANATION OF REFERENCE NUMERALS

1 tread part
2 sidewall part
3 bead part
4 carcass layer
5 bead core
6 belt layer
7 belt layer-side rubber layer
8 tread-side rubber layer
9 layer made of a thermoplastic resin or a thermoplastic elastomer composition obtained by blending an elastomer in a thermoplastic resin (thermoplastic film layer)
10 wing tip rubber

What is claimed is:

1. A pneumatic radial tire comprising:
   at least one carcass layer suspended across left and right bead parts;
   a belt layer arranged on an outer circumferential side of the carcass layer; and
   a tread arranged on an outer circumferential side of the belt layer, wherein the tread has a laminated structure in which a thermoplastic film layer, made of any one of a thermoplastic resin and a thermoplastic elastomer composition obtained by blending an elastomer in a thermoplastic resin, is interposed between a tread-side rubber layer and a belt layer-side rubber layer, wherein
   a thickness of the belt layer-side rubber layer is not less than 2 mm and not more than 5 mm, wherein when the tread is sufficiently heated the thermoplastic film layer is softened by the heating whereby the tread-side rubber layer can be separated from the belt-side rubber layer at the softened thermoplastic film layer without a buffing operation,
   a thickness of the thermoplastic film layer is 50 to 150 μm, the thermoplastic film layer is placed intermittently in a tire meridian cross section, and
   a density of the placement of the thermoplastic film layer in a tire center portion is higher than the density of the placement in a tire shoulder portion.

2. The pneumatic radial tire according to claim 1, wherein a width of the thermoplastic film layer is at least equal to or larger than a maximum width of the belt layer.

3. The pneumatic radial tire according to claim 2, wherein an adhesive layer is laminated to at least one surface of the thermoplastic film layer.

4. The pneumatic radial tire according to claim 1, wherein an adhesive layer is laminated to at least one surface of the thermoplastic film layer.

5. The pneumatic radial tire according to claim 1, wherein the thermoplastic film layer includes at least 30 wt % of thermoplastic resin.

6. A pneumatic radial tire comprising:
   at least one carcass layer suspended across left and right bead parts;
   a belt layer arranged on an outer circumferential side of the carcass layer; and
   a tread arranged on an outer circumferential side of the belt layer, wherein the tread has a laminated structure in which a thermoplastic film layer, made of any one of a thermoplastic resin and a thermoplastic elastomer composition obtained by blending an elastomer in a thermoplastic resin, is interposed between a tread-side rubber layer and a belt layer-side rubber layer, wherein
   a thickness of the belt layer-side rubber layer is not less than 2 mm and not more than 5 mm, wherein when the tread is sufficiently heated the thermoplastic film layer is softened by the heating whereby the tread-side rubber layer can be separated from the belt-side rubber layer at the softened thermoplastic film layer without a buffing operation,
   a thickness of the thermoplastic film layer is 50 to 150 μm, and
   a large number of through-holes are provided in the thermoplastic film layer.

7. The pneumatic radial tire according to claim 6, wherein a width of the thermoplastic film layer is at least equal to or larger than a maximum width of the belt layer.

8. A process for producing a retreaded tire, comprising the steps of:
   forming a base tire from a pneumatic radial tire comprising:
   at least one carcass layer suspended across left and right bead parts;
   a belt layer arranged on an outer circumferential side of the carcass layer; and
   a tread arranged on an outer circumferential side of the belt layer, wherein the tread has a laminated structure in which a thermoplastic film layer, made of any one of a thermoplastic resin and a thermoplastic elastomer composition obtained by blending an elastomer in a thermoplastic resin, is interposed between a tread-side rubber layer and a belt layer-side rubber layer, and the tread-side rubber layer being partially worn away;
      wherein the base tire is formed by sufficiently heating the tread so as to soften the thermoplastic film layer through the heating, then separating and removing the tread-side rubber layer from the belt-side rubber layer at the softened thermoplastic film layer without a buffing operation, and
      subsequently bonding a new tread-side rubber layer onto the base tire.

9. The process for producing a retreaded tire according to claim 8, wherein the step of bonding the new tread-side rubber layer onto the base tire includes arranging a new thermoplastic film layer between the base tire and the tread-side rubber layer.

10. The process for producing a retreaded tire according to claim 8, wherein the tread is heated in a range of 140° C.-200° C. to soften the thermoplastic film layer.

11. The process for producing a retreaded tire according to claim 8, wherein the thermoplastic film layer includes at least 30 wt % of thermoplastic resin.

12. A process for producing a retreaded tire, comprising the steps of:
   forming a base tire from a pneumatic radial tire comprising:
   at least one carcass layer suspended across left and right bead parts;
   a belt layer arranged on an outer circumferential side of the carcass layer; and
   a tread arranged on an outer circumferential side of the belt layer, wherein the tread has a laminated structure in which a thermoplastic film layer, made of any one of a thermoplastic resin and a thermoplastic elastomer composition obtained by blending an elastomer in a thermoplastic resin, is interposed between a tread-side rubber layer and a belt layer-side rubber layer, and the tread-side rubber layer being partially worn away;
      wherein a width of the thermoplastic film layer is at least equal to or larger than a maximum width of the belt layer;
      and wherein the base tire is formed by sufficiently heating the tread so as to soften the thermoplastic film layer through the heating, then separating and removing the tread-side rubber layer from the belt-side rubber layer at the softened thermoplastic film layer without a buffing operation, and
      subsequently bonding a new tread-side rubber layer onto the base tire.

13. The process for producing a retreaded tire according to claim 12, wherein the tread is heated in a range of 140° C.-200° C. to soften the thermoplastic film layer.

14. The process for producing a retreaded tire according to claim 12, wherein the thermoplastic film layer includes at least 30 wt % of thermoplastic resin.

* * * * *